H. C. DREISVOGT.
SHIFT TRANSMISSION GEARING.
APPLICATION FILED MAY 12, 1909.

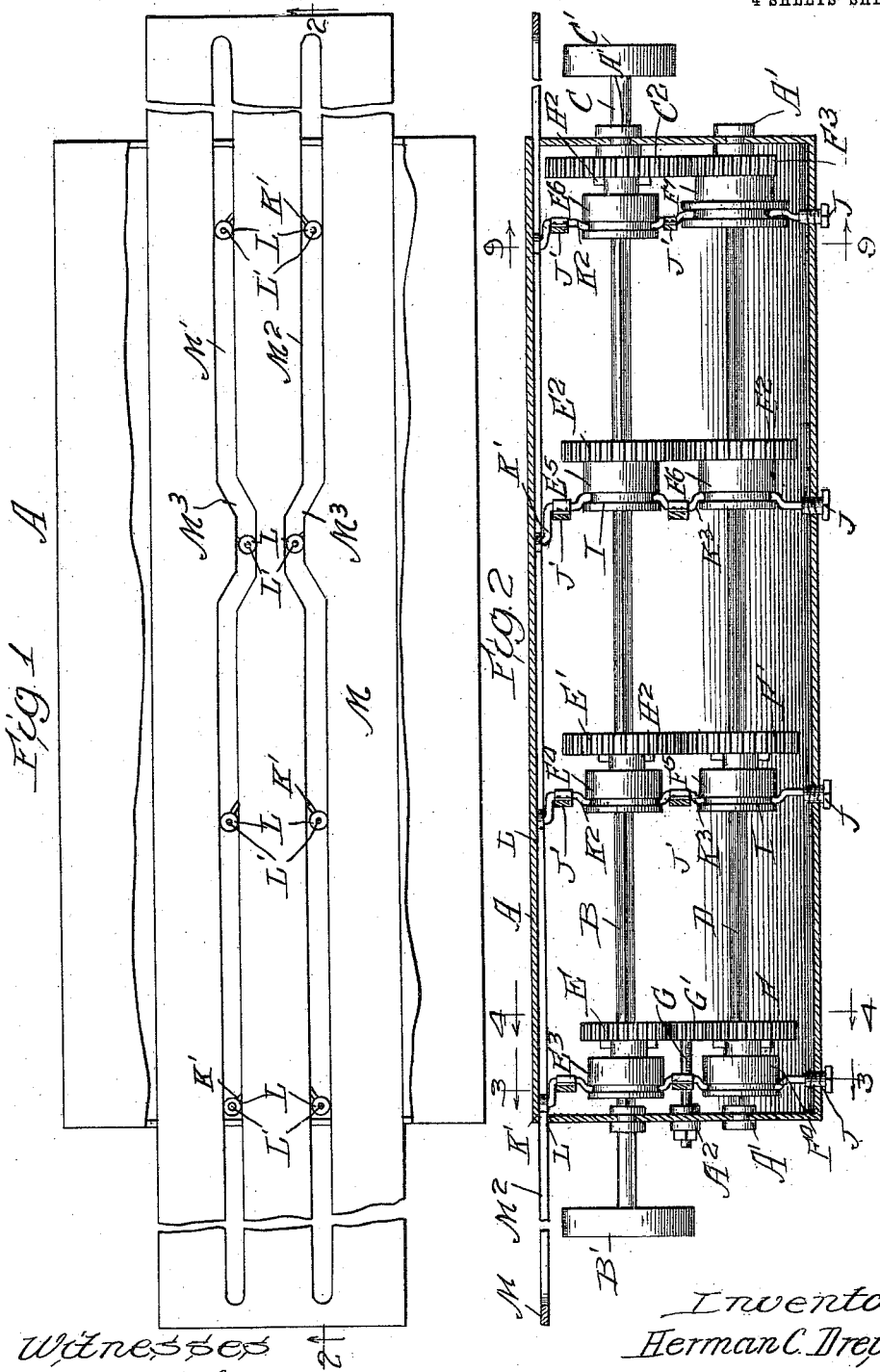

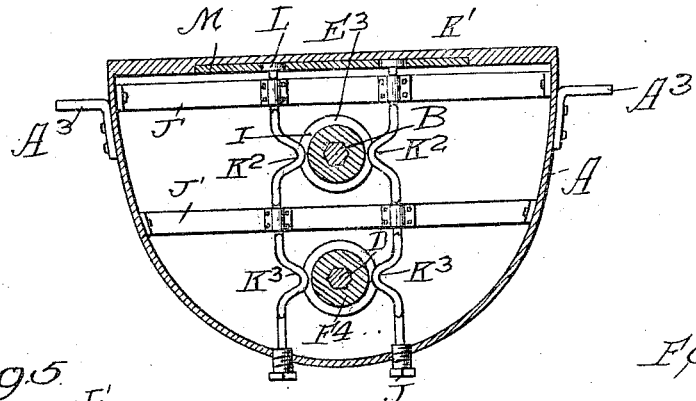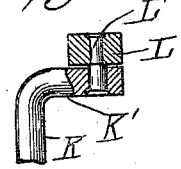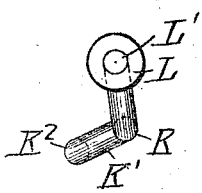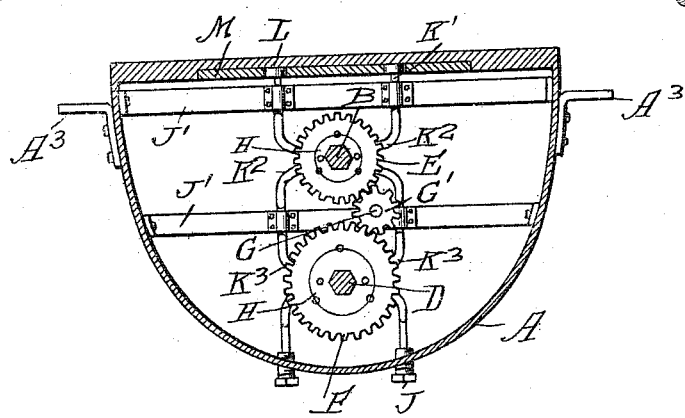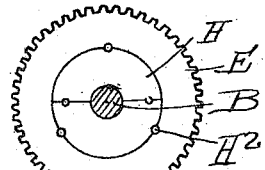

983,217.

Patented Jan. 31, 1911.
4 SHEETS—SHEET 3.

Witnesses
H. R. L. White
Q. A. White

Inventor:
Herman C. Dreisvogt.
By Morgan & Rubinstein Attys

H. C. DREISVOGT.
SHIFT TRANSMISSION GEARING.
APPLICATION FILED MAY 12, 1909.
983,217.
Patented Jan. 31, 1911.
4 SHEETS—SHEET 4.
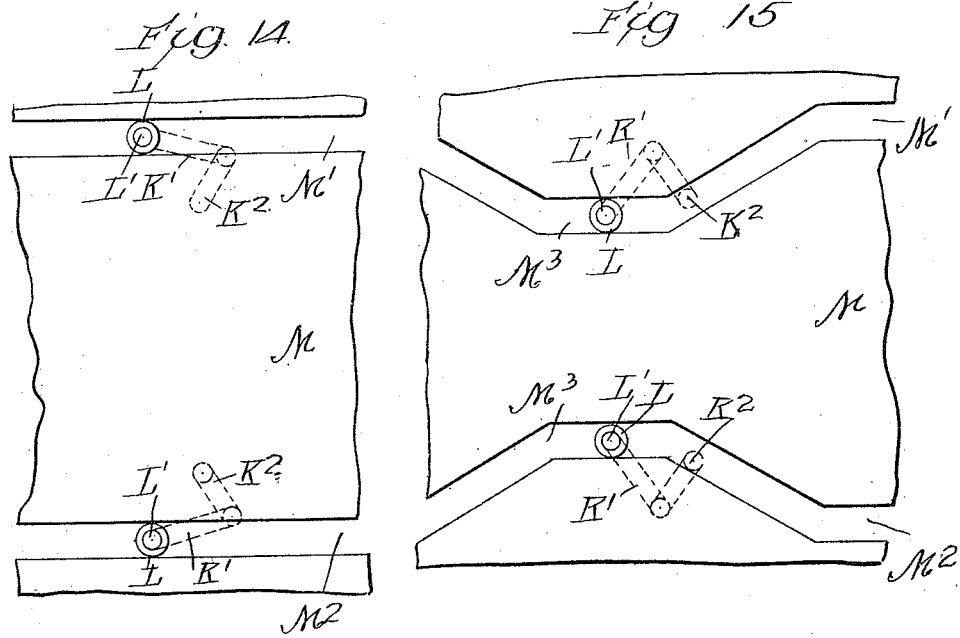
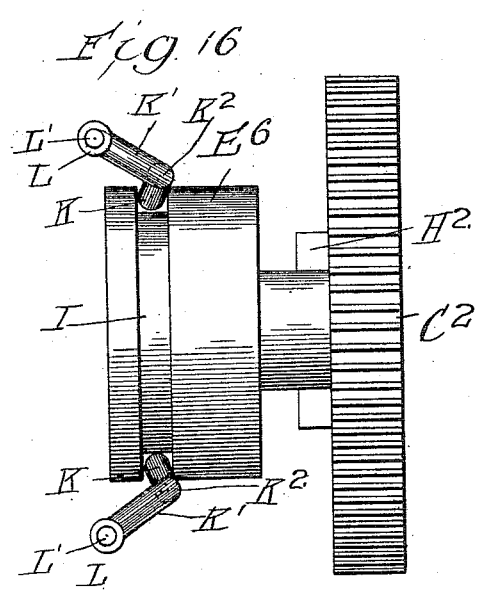
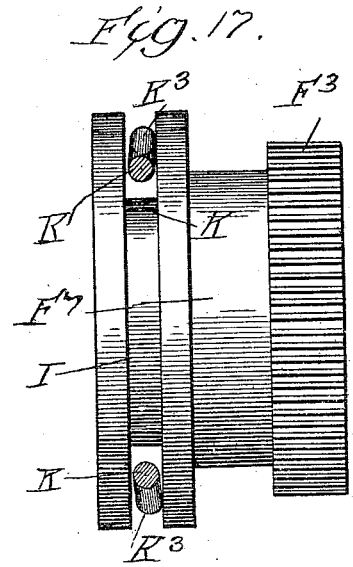
Witnesses
Inventor
Herman C. Dreisvogt.
By Morgan & Rubinstein Attys

UNITED STATES PATENT OFFICE.

HERMAN C. DREISVOGT, OF CHICAGO, ILLINOIS.

SHIFT TRANSMISSION-GEARING.

983,217.

Specification of Letters Patent.  Patented Jan. 31, 1911.

Application filed May 12, 1909. Serial No. 495,555.

*To all whom it may concern:*

Be it known that I, HERMAN C. DREISVOGT, a citizen of the United States, residing at Chicago, in the county of Cook and State of Illinois, have invented a new and useful Improvement in Shift Transmission-Gearing, of which the following is a specification.

The object of my invention is to provide a simple mechanism for automobiles and other power machinery by which various changes of speed, and a reversible motion may be made in the driven mechanism and the driving and driven parts be disconnected while the speed and direction of the driving power remains unchanged.

Figure 9:
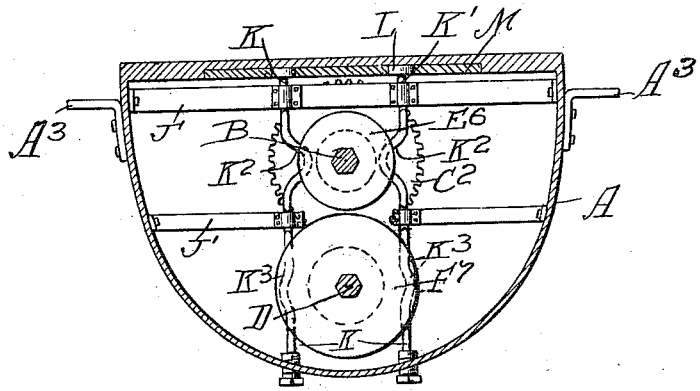
Figure 10:
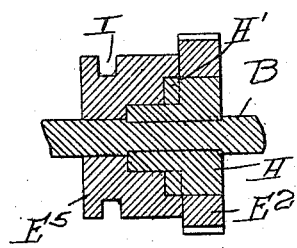
Figure 11:
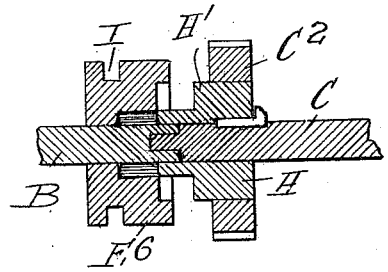
Figure 12:
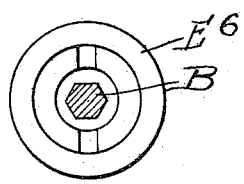
Figure 13:
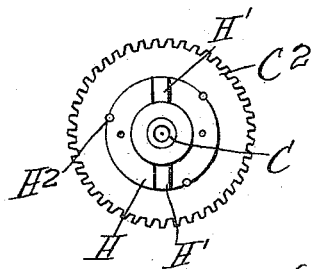

The manner in which I accomplish my object is described in the following specification and illustrated in the accompanying drawings in which;

Figure 1 is a top plan view of a box containing the gearing with part broken away to show a sliding plate and ends of crank shafts and rollers thereon. Fig. 2 is a longitudinal vertical section on the line 2—2 Fig. 1, showing the driving and countershafts, gear wheels, and clutches thereon, and crank shafts by which said clutches are moved. Fig. 3 is a vertical cross section on the line 3—3 Fig. 2, showing the relative positions of the crank shafts and clutches and their connection. Fig. 4 is a vertical cross section on the line 4—4 Fig. 2, showing positions of driving and counter shafts, gear wheels thereon and intermediate gear in mesh therewith by which the reverse motion of the driven parts is made. Fig. 5 is a side elevation showing the top ends of the crank shafts with rollers thereon. Fig. 6 is a top plan of the parts shown in Fig. 5. Fig. 7 shows part of the driving and counter shafts. These are angular in section and are journaled for the bearings for the gears. Fig. 8 is a side elevation showing the construction of the gears which are provided with split center bearings to fit the journals on the angular shafts. Fig. 9 is a vertical cross section on the line 9—9 Fig. 2, which shows the shape of the crankshafts and their contact with the clutches. Fig. 10 and Fig. 11 are central sectional views of the lower and upper clutches and gears shown at the right end of Fig. 2 and in the center of Fig. 9 through the center of the shafts. Fig. 10 shows the lower clutch closed. Fig. 11 shows the clutch open and the connecting shafts by which a direct drive is obtained when all other clutches are out of contact with their respective gears. Fig. 12 is a side elevation of one of the clutches, and Fig. 13 is a side elevation of one of the gears. Figs. 14, 16 and 17 are enlarged detail views of parts shown in Figs. 1, 2 and 9, and Fig. 15 is an enlarged view of parts shown in Figs. 1 and 2.

In the drawings A indicates a box in which the mechanism is supported and inclosed, $A^1$ are bearings therein, $A^2$ is a stud bearing shaft in the left end of the box. Supported in the bearings $A^1$ is a driving shaft B adapted to be coupled at the external end $B^1$ with any suitable motive power. The opposite end within the box is bored in the center to admit the end of a shaft C supported in the bearing $A^1$ in the right end of the box, and which is adapted to be rotated with the shaft B or independently. The external end $C^1$ of this shaft is adapted to be coupled with any mechanism suitable to be driven thereby. Parallel with the shaft B is a counter shaft D. The shafts B and D are angular in section and are journaled to fit the bearings in the box A and for the support of gear wheels within the box. Rotatably supported on the journaled parts of the shaft B are gear wheels E, $E^1$, and $E^2$. Slidably supported on the angular parts of the same shaft and rotatable therewith are clutches $E^3$, $E^4$, $E^5$, and $E^6$. Rotatably supported on the journaled parts of the shaft D are gear wheels F, $F^1$, $F^2$, and $F^3$. Slidably supported on the angular parts of the same shaft are clutches $F^4$, $F^5$, $F^6$, and $F^7$. Fixed on the shaft C is a gear wheel $C^2$ which is permanently in mesh with the gear wheel $F^3$. Rotatably supported on the stud shaft G is a gear wheel $G^1$ which is permanently in mesh with the gear wheels E and F. The gear wheels $E^1$ and $F^1$ are permanently in mesh, and so are the gear wheels $E^2$ and $F^2$. Each of the gear wheels E, $E^1$, $E^2$, F, $F^1$ and $F^2$ are constructed with a split center piece H. These are bored to fit the journaled parts of the shafts B and D, and each piece has two clutch teeth $H^1$ and are connected, and secured in the gear by rivets $H^2$. Each of the clutches $E^3$, $E^4$, $E^5$, $F^4$, $F^5$, and $F^6$ are equal in diameter and each one has an annular groove I and two teeth adapted to engage the teeth of the gear wheels. The clutch $F^7$ differs from the other clutches in the increased diameter of the grooved part for the purpose hereinafter described. Supported in the bearings J and J¹ are crank shafts K. These shafts are arranged in pairs and each pair is adapted to engage and move two clutches, one on shaft B the other on shaft D. Each shaft has three cranks, a top crank K¹, a middle crank K², and a bottom crank K³. On the crank K¹ is a roller L supported on the crank pin L¹. The distance from the longitudinal center line of the shaft K and center of the crank pin L¹ is the same in all, and the length of the radius of the cranks K² and K³ are equal.

The crank shafts are arranged in the box A so that the cranks K² and K³ of each pair are rotatably engaged in the grooves I of their respective pair of clutches, one on the shaft B and the other on the shaft D and rotatable between said crank shafts as shown in Figs. 2 and 3. The rollers L are engaged in a bar M. This bar is flat and extends longitudinally through suitable bearings in the ends of the box immediately beneath the top. In this bar are two slots M¹ and M² extending the length of the bar and parallel except in the central part M³ where the slots converge in a V shape. In these slots the rollers L on the cranks K¹ are engaged and free to rotate by the sliding movement of the bar, and the cranks K¹ of each pair of crank shafts are partly rotated as their respective rollers enter and leave the converging parts M³ of the slots. The crank shafts K thus partly rotated move the clutches engaged by the cranks K² and K³ into engagement with their respective gears as shown in Fig. 2; all other clutches being out of engagement with their respective gears except clutch F⁷ on the shaft D which is held in engagement while the rollers on the crank shaft in engagement with that clutch are in the parallel parts of the slots M¹ and M². This exception is caused by the position of the cranks K³ which are the reverse of the cranks K² on the same pair of crank shafts and the larger diameter of the grooved part of the clutch F⁷ engaged by the cranks K³ whereby when this pair of crank shafts are partly rotated by the movement of the bar and entry of the rollers into and out of the parts M³ move the clutches E⁶ and F⁷ in opposite directions on the shafts B and D.

When my device is constructed as described and illustrated its operation is as follows: By means of brackets A³ the box A can be attached to the frame of an automobile or other structure and connected at the end B¹ of the shaft B to a motive power. The sliding bar M can be moved by a lever or other suitable means attached to either end and to the structure supporting the box A. When the bar is set in position where all the rollers L are in the parallel parts of the slots M¹ and M² and the motive power applied the shaft B and clutches thereon alone revolve. When the bar is moved to the extreme right and the parts M³ operate the right end pair of crank shafts the cranks K² throw the clutch E⁶ into engagement with the gear C² and throw the clutch F⁷ out of engagement with the gear F³. The rotation of the shaft B is transmitted by the clutch E⁶ to the gear C² whereby a straight drive is established through the shafts B and C. A movement of the bar to the left disengages the clutch E⁶ and moves the clutch F⁷ into engagement with the gear F³ and as the part M³ moves the next pair of crank shafts K² and K³ throw the clutches E⁵ and F⁶ into engagement with the gears E² and F² whereby the transmission of power is from the shaft B through the gears E² and F² shaft D, gears F⁷ and C² to the shaft C with a change of speed determined by the difference in size of the gears E² and F². A further movement of the bar to the left releases the clutches E⁵ and F⁶ and the part M³ rotates the next pair of crank shafts and moves the clutches E⁴ and F⁵ into engagement with the gears E¹ and F² by which another change of speed is produced, the direction of the transmission of power being the same as before. The further movement of the bar to the left releases the clutches E⁴ and F⁵ and operating the end pair of crank shafts moves the clutches E³ and F⁴ into engagement with the gears E and F whereby the motive power is transmitted through the intermediate gear G¹ to the gear F, shafts D and C whereby the shafts D and C are rotated in opposite direction to that of the shaft B.

It is obvious that the size of the several gears determines the rate of the several speeds and of the reverse; that the space between the teeth of the clutches and of the gears make the shift positive and noiseless; that the slight movement of the clutches permits the highest number of changes in the smallest practical space, and the oil tight inclosure of all parts.

What I claim as new and desire to secure by Letters Patent is:

1. A box having shaft bearings; a driving shaft and an independent shaft both in line in said box and bearings; gear wheels rotatable on said driving shaft and a gear wheel fixed on said independent shaft; clutches slidable on said driving shaft and rotatable therewith, adapted to engage and rotate said wheels and said independent shaft; a counter shaft parallel with said driving shaft, gear wheels rotatable on said counter shaft and in mesh with said wheels on said driving and independent shafts; clutches slidably secured on said counter shaft and rotatable therewith adapted to be moved into and out of engagement with said wheels on said counter shaft; crank shafts in said box in contact with said clutches adapted when partly rotated to move one or more of said clutches into and out of engagement with said wheels; a sliding bar in said box in contact with said crank shafts and adapted when moved to partly rotate one or more of said crank shafts; an intermediate gear in mesh with one of said wheels on said driving and counter shafts whereby a reverse movement of said counter shaft is obtained as described.

2. In a device of the kind described, the combination with a supporting structure, a plurality of shafts arranged parallel therein, gear wheels in mesh and rotatable on said shafts, and clutches slidable on said shafts and rotatable therewith; of double cranked rods pivotally supported at right angles to said shafts, each rod being adapted to engage a clutch on each of said shafts, and means adapted to partly rotate said rods and to thereby move said clutches into and out of engagement with said gears.

3. In a device of the kind described, the combination with a supporting structure, shafts parallel and rotatable therein, gear wheels in mesh rotatable on said shafts, and clutches slidably secured on said shafts; of double cranked rods pivotally supported in said structure at right angles to said shafts and parallel with each other, arranged in pairs, each pair adapted to engage a clutch on each of said shafts, and to move said clutches into and out of engagement; and means adapted to partly rotate said rods whereby said clutches are moved into and out of engagement.

4. In a device of the kind described, the combination with a supporting structure, driving and driven shafts parallel therein gears in mesh rotatable on said shafts, clutches slidably secured on said shafts; cranked rods rotatably supported in pairs at right angles to said shafts in engagement with said clutches, each pair of rods being adapted to engage one of said clutches on each of said shafts and to move them into and out of engagement with said gearwheels; of a pair of said cranked rods adapted when partly rotated to move the two clutches engaged thereby in opposite directions, one clutch being moved into engagement with a gear wheel on one shaft, and the other clutch being moved out of engagement with a gear wheel on another shaft, and means adapted to partly rotate said cranked rods.

5. In a device described, the combination consisting of supporting means, a driving, counter, intermediate and independent shafts rotatable in said supporting means, a plurality of gear wheels rotatably supported on said shafts, and a gear wheel fixed on said independent shaft, said gears being in mesh, a plurality of clutches slidably supported on said driving and counter shafts and rotatable therewith, and a plurality of crank shafts rotatably supported in said supporting means adapted to be partly rotated and to thereby move said clutches into and out of engagement with said gears; with a bar slidable in said supporting structure adapted to be moved and operate said crank shafts whereby said clutches, gears, and shafts are connected and disconnected and said counter and independent shafts rotated at various speeds and reversed as described.

6. In a device as described, the combination consisting of a supporting structure, a driving, counter, intermediate, and independent shafts rotatable in said structure; a plurality of gear wheels rotatably supported on said shafts, and a gear wheel fixed on said independent shaft, all of said gears being in mesh in said structure, a plurality of clutches rotatable with said shafts and slidable thereon into and out of engagement with said gear wheels; crank shafts rotatably supported in said structure in contact with said clutches adapted when partly rotated to move said clutches on said shafts into and out of engagement with said gears; with a slotted plate slidably supported in said structure, said crank shafts being engaged in the slot or slots in said plate, whereby when said plate is moved said cranks are partly rotated as described.

HERMAN C. DREISVOGT.

Witnesses:
  THOMAS J. MORGAN,
  JULIUS RUBINSTEIN.